United States Patent
Mohamed et al.

(10) Patent No.: US 7,127,588 B2
(45) Date of Patent: Oct. 24, 2006

(54) APPARATUS AND METHOD FOR AN IMPROVED PERFORMANCE VLIW PROCESSOR

(75) Inventors: Moataz A. Mohamed, Irvine, CA (US); John R. Spence, Villa Park, CA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 467 days.

(21) Appl. No.: 09/730,039

(22) Filed: Dec. 5, 2000

(65) Prior Publication Data

US 2002/0069345 A1 Jun. 6, 2002

(51) Int. Cl.
G06F 15/82 (2006.01)

(52) U.S. Cl. .................................................. 712/24

(58) Field of Classification Search .................. 712/24, 712/21, 215
See application file for complete search history.

(56) References Cited

U.S. PATENT DOCUMENTS

| | | | |
|---|---|---|---|
| 4,953,078 A | | 8/1990 | Petit |
| 5,574,939 A | | 11/1996 | Keckler et al. |
| 5,669,001 A | * | 9/1997 | Moreno ....................... 717/149 |
| 5,694,603 A | | 12/1997 | Reiffin |
| 5,721,854 A | * | 2/1998 | Ebcioglu et al. ............ 712/203 |
| 5,742,782 A | * | 4/1998 | Ito et al. ..................... 712/210 |
| 5,787,303 A | * | 7/1998 | Ishikawa ..................... 712/24 |
| 5,848,288 A | * | 12/1998 | O'Connor ................... 712/24 |
| 6,170,051 B1 | * | 1/2001 | Dowling ...................... 712/225 |
| 6,343,348 B1 | * | 1/2002 | Tremblay et al. ........... 711/149 |
| 6,363,475 B1 | * | 3/2002 | Dowling ..................... 712/206 |
| 6,467,036 B1 | * | 10/2002 | Pechanek et al. ............ 712/24 |
| 6,615,338 B1 | * | 9/2003 | Tremblay et al. ............ 712/24 |
| 6,658,551 B1 | * | 12/2003 | Berenbaum et al. .......... 712/24 |

(Continued)

OTHER PUBLICATIONS

Thomas M. Conte and Sumedh W. Sathaye. "Dynamic Rescheduling: A Technique for Object Code Compatibility in VLIW Architectures". Microarchitecture, 1995.*

(Continued)

Primary Examiner—Eddie Chan
Assistant Examiner—Aimee J. Li
(74) Attorney, Agent, or Firm—Farjami & Farjami LLP

(57) ABSTRACT

In one exemplary embodiment, the disclosed VLIW processor comprises a number of threads where each thread includes a processing unit. For example, there can be two threads, where each of the two threads has its own processing unit. According to this exemplary embodiment, a number of VLIW packets are divided into a number of issue groups. As an example, two VLIW packets are divided into two issue groups each. The first issue group in the first VLIW packet is provided to a first thread for execution in the first thread processing unit during a first clock cycle. Concurrently, the first issue group in the second VLIW packet is provided to a second thread for execution in the second thread processing unit during the same clock cycle, i.e. during the first clock cycle. Moreover, the second issue group in the first VLIW packet is provided to the first thread for execution in the first thread processing unit during a second clock cycle. Concurrently, the second issue group in the second VLIW packet is provided to the second thread for execution in the second thread processing unit during the same clock cycle, i.e. during the second clock cycle. In this manner, various resources of the VLIW processor are efficiently utilized and two VLIW packets are executed during two clock cycles. As such, the processing speed of the VLIW processor is doubled without a significant increase in the power consumed by the VLIW processor.

18 Claims, 4 Drawing Sheets

U.S. PATENT DOCUMENTS 6,718,457 B1 * 4/2004 Tremblay et al. ........... 712/212

OTHER PUBLICATIONS

Morteza Biglari-Abhari, Kamran Eshraghian, and Michael J. Liebelt. "Improving Binary Compatibility in VLIW Machines through Compiler Assisted Dynamic Rescheduling". Euromicro Conference, 2000. Proceedings of the 26th, vol. 1, Sep. 5-7, 2000.*

Alberto Ferreira de Souza and Peter Rounce. "Dynamically Scheduling the Trace Produced During Program Execution into VLIW Instructions". Parallel and Distributed Processing, 1999. Proceedings, Apr. 12-16, 1999.*

Michael Weiss, Zhixi Fang, C. Robert Morgan, and Peter Belmont. "Effective Dynamic Scheduling and Memory Management on Parallel Processing Systems". Computer Software and Applications Conference, 1989.*

Santoshkumar S. Pande, Dharma P. Agrawal, and Jon Mauney. "Palm: An Integrated Parallelism Enhancement Environment with Static-Dynamic Scheduling". System Sciences, 1992.*

B. Ramakrishna Rau. "Dynamically Scheduled VLIW Processors". Microarchitecture, 1993.*

* cited by examiner

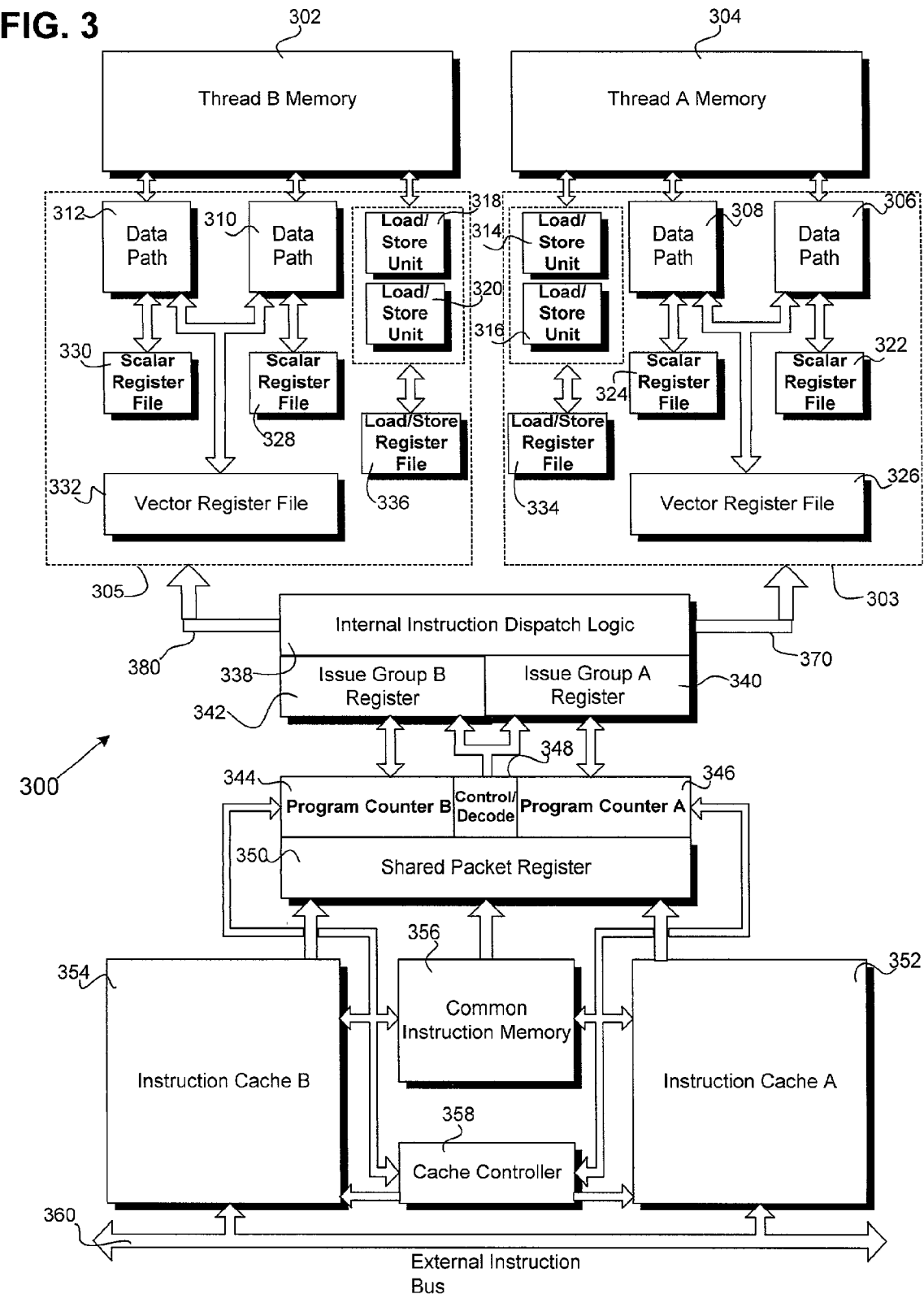

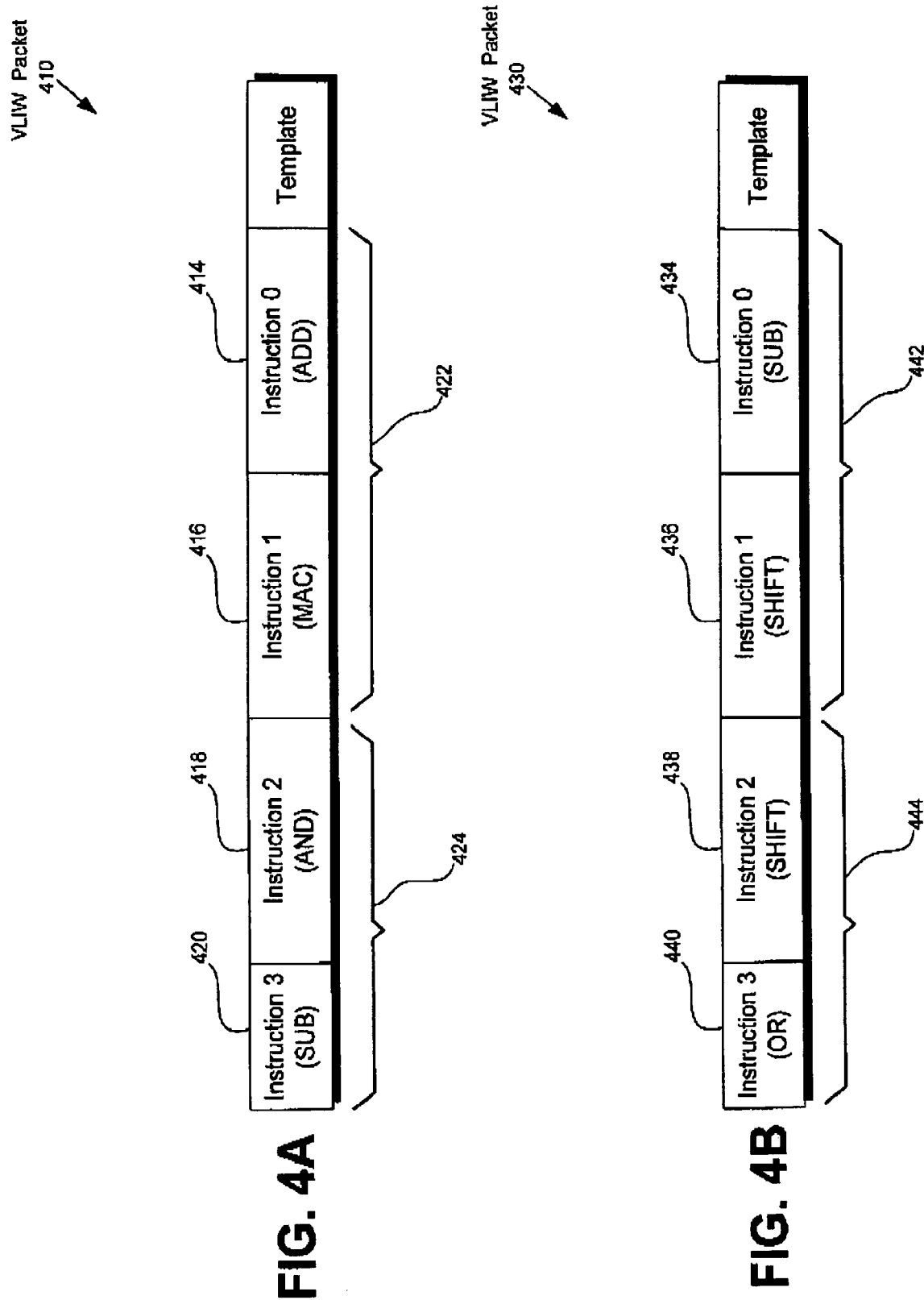

APPARATUS AND METHOD FOR AN IMPROVED PERFORMANCE VLIW PROCESSOR

BACKGROUND OF THE INVENTION

1. Field of the Invention

The present invention is generally in the field of processors. In particular, the invention is in the field of VLIW processors.

2. Background Art

VLIW (Very Long Instruction Word) processors use an approach to parallelism according to which several instructions are included in a very long instruction word. Each very long instruction word fetched from the memory is part of a packet referred to in this application as a "VLIW packet" or an "instruction packet."

By way of background, a VLIW packet typically contains a number of instructions which can be executed in the same clock cycle. Instructions in a VLIW packet which can be executed in the same clock cycle form a single "issue group." By definition, instructions belonging to a same issue group do not depend on the result of execution of other instructions in that same issue group. However, instructions in one issue group may is or may not depend on the result of execution of instructions in another issue group. The "length" of an issue group specifies how many instructions are in that issue group. For example, a particular issue group may have a length of two, three, four, five, or six instructions. Thus, the individual instructions in a VLIW packet are arranged in different issue groups and there can be a number of issue groups in a VLIW packet.

Instructions which are in a same issue group are concurrently forwarded (i.e. "issued") to their respective execution units for execution in a same clock cycle. Accordingly, execution of all instructions in a VLIW packet takes as many clock cycles as there are issue groups in that VLIW packet. For example, if a particular VLIW packet contains two issue groups, two clock cycles are required to execute that VLIW packet.

Referring to FIG. 1, one possible composition of a VLIW packet, such as VLIW packet 100, is now discussed. As shown in FIG. 1, seven individual instructions in VLIW packet 100 are placed in "instruction slots" 104 through 116. More specifically, instruction 0 is placed in instruction slot 104, instruction 1 is placed in instruction slot 106, instruction 2 is placed in instruction slot 108, instruction 3 is placed in instruction slot 110, instruction 4 is placed in instruction slot 112, instruction 5 is placed in instruction slot 114, and instruction 6 is placed in instruction slot 116. In exemplary VLIW packet 100, each individual instruction 0 through 6 is a 16-bit instruction.

Exemplary VLIW packet 100 also includes template 102 which contains information such as how many issue groups exist in VLIW packet 100 and which instructions in exemplary VLIW packet 100 belong to the same issue group. Moreover, template 102 typically contains information for assigning instructions to particular instruction slots in a VLIW packet for execution in appropriate execution units. In exemplary VLIW packet 100, template 102 comprises 16 bits. Thus, the entire VLIW packet 100 consists of 128 bits, i.e. seven 16-bit instructions plus a 16-bit template.

FIG. 2 shows another possible composition of a VLIW packet. As shown in FIG. 2, four individual instructions in VLIW packet 200 are placed in "instruction slots" 204 through 210. More specifically, instruction 0 is placed in instruction slot 204, instruction 1 is placed in instruction slot 206, instruction 2 is placed in instruction slot 208, and instruction 3 is placed in instruction slot 210. In exemplary VLIW packet 200, each individual instruction 0 through 2 is a 32-bit instruction while individual instruction 3 is a 16-bit instruction.

As with exemplary VLIW packet 100, exemplary VLIW packet 200 also includes a template, i.e. template 202, which contains information such as how many issue groups exist in VLIW packet 200 and which instructions in exemplary VLIW packet 200 belong to the same issue group. Moreover, template 202 typically contains information for assigning instructions to particular instruction slots in a VLIW packet for execution in appropriate execution units. In exemplary VLIW packet 200, template 202 comprises 16 bits. Thus, the entire VLIW packet 200 consists of 128 bits, i.e. three 32-bit instructions plus one 16-bit instruction and a 16-bit template.

Although VLIW processors result in a great advantage in parallel processing of a large number of instructions, there is need to improve the speed and power consumption of conventional VLIW processors and also achieve a more area-efficient processor. To illustrate these points, reference is made to exemplary VLIW packet 200. In exemplary VLIW packet 200 there are three "long instructions" (i.e. three 32-bit instructions) and one "short instruction" (i.e. one 16-bit instruction). Moreover, suppose that there are two issue groups in exemplary VLIW packet 200; a first issue group consisting of long instructions 0 and 1 and a second issue group consisting of long instruction 2 and short instruction 3.

After exemplary VLIW packet 200 is fetched from a cache or an external memory, the four instructions in VLIW packet 200 must be forwarded to appropriate execution units for execution. To account for the possibility that all of the instructions in a given VLIW packet may belong to a single issue group, the instruction bus coupled to the execution units of the VLIW processor must be 112 bits wide to carry all four instructions in the VLIW packet at the same time. However, as illustrated in the present example, the first issue group consists of merely two long instructions requiring an instruction bus that is only 64 bits wide while the second issue group consists of merely one long instruction and one short instruction requiring an instruction bus that is only 48 bits wide. Thus, in the case of exemplary VLIW packet 200, an instruction bus that is 64 bits wide is all that is needed to handle the processing of both the first and second issue groups in the VLIW packet. As such, a 112-bit wide instruction bus would result in an unnecessary power consumption associated with 48 bus lines that are not needed in the processing of exemplary VLIW packet 200. Further, an instruction bus which is 112 bits wide requires considerably greater chip area as compared with an instruction bus which is only 64 bits wide.

Moreover, many of the VLIW processor's logic units and resources would not be used in an effective manner during the execution of exemplary VLIW packet 200 which requires two clock cycles for its execution. During the execution of the first issue group consisting of long instructions 0 and 1, some of the processor's logic units, such as the instruction fetch unit, are not being used. The reason is that an instruction fetch operation is not required until after completion of the execution of the second issue group which would not occur until the second clock cycle. However, the clocked circuitry inside the instruction fetch unit consumes power even though no instruction is being fetched. As such, the additional clock cycle required for the execution of the second issue group results in an unnecessary power consumption in various logic units such as the instruction fetch unit. In essence, all logic units in the VLIW processor which are being clocked, but not utilized until the completion of the execution of the second issue group, contribute towards an unnecessary power consumption. Examples of units contributing to the unnecessary consumption of power are the fetch logic unit, the decode logic unit, and various buses.

Furthermore, during the execution of the first issue group of exemplary VLIW packet 200, it would be desirable to utilize the VLIW processor resources and logic units to execute an independent issue group belonging to another VLIW packet. Execution of two independent issue groups in the same clock cycle would, manifestly, result in a significant increase in the speed of the VLIW processor. However, it is desirable to utilize the resources of the VLIW processor in such a manner so as to not cause a significant increase in the power consumption of the VLIW processor while significantly increasing the speed of the VLIW processor by executing two independent issue groups belonging to two different VLIW packets in the same clock cycle.

Thus, the conventional VLIW processor architecture results in an unnecessary power consumption while permitting the execution of only a single issue group per clock cycle. Moreover, the conventional VLIW processor requires a relatively large chip area for an instruction bus which is too wide and not effectively used. As such, there is need in the art to overcome the above-discussed shortcomings in the conventional VLIW processors.

SUMMARY OF THE INVENTION

The present invention is directed to a high performance VLIW processor. In one exemplary embodiment, the invention's VLIW processor executes two issue groups from two different VLIW packets during the same clock cycle without significantly increasing the power consumption. In this manner, two VLIW packets are executed in two clock cycles without significantly increasing the power consumption. The invention results in an efficient utilization of power that would otherwise be unnecessarily consumed in conventional VLIW processors. As such, in one exemplary embodiment, the processing speed of a conventional VLIW processor is doubled without a significant increase in the power consumed by the VLIW processor.

In one exemplary embodiment, the invention's VLIW processor comprises a number of threads where each thread includes a processing unit. For example, there can be two threads, where each of the two threads has its own processing unit. According to this exemplary embodiment, a number of VLIW packets are divided into a number of issue groups. As an example, two VLIW packets are divided into two issue groups each. The first issue group in the first VLIW packet is provided to a first thread for execution in the first thread processing unit during a first clock cycle. Concurrently, the first issue group in the second VLIW packet is provided to a second thread for execution in the second thread processing unit during the same clock cycle, i.e. during the first clock cycle.

Moreover, the second issue group in the first VLIW packet is provided to the first thread for execution in the first thread processing unit during a second clock cycle. Concurrently, the second issue group in the second VLIW packet is provided to the second thread for execution in the second thread processing unit during the same clock cycle, i.e. during the second clock cycle.

In this manner, various resources of the invention's VLIW processor are efficiently utilized and two VLIW packets are executed during two clock cycles. As such, the processing speed of the VLIW processor is doubled without a significant increase in the power consumed by the VLIW processor. In one embodiment, each VLIW packet is 128 bits wide while in another embodiment each VLIW packet is 256 bits wide. However, VLIW packets of any width can be used. Moreover, while in one exemplary embodiment the invention's VLIW processor utilizes two threads; in another embodiment, four threads can be used, where each thread has a respective processing unit.

BRIEF DESCRIPTION OF THE DRAWINGS

FIG. 3 illustrates a portion of an embodiment of the present invention's VLIW processor.

FIGS. 4A and 4B illustrate two exemplary VLIW packets which have been divided into two issue groups for execution in an embodiment of the present invention's VLIW processor.

DETAILED DESCRIPTION OF THE INVENTION

Figure 1:
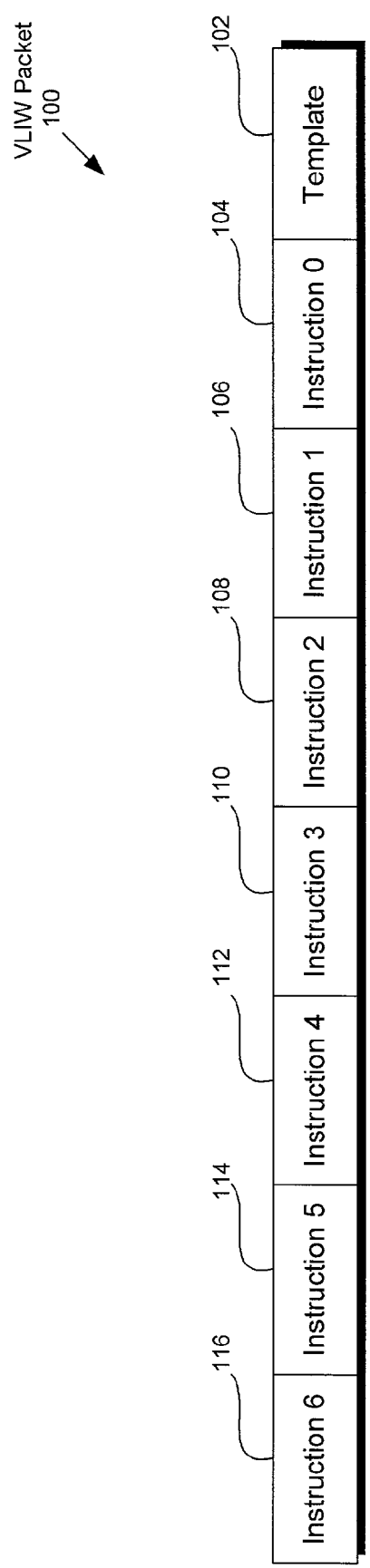
FIG. 1 illustrates a VLIW packet which comprises a template and seven short instructions.

The present invention is directed to a high performance VLIW processor. Although the invention is described with respect to specific embodiments, the principles of the invention, as defined by the claims appended herein, can obviously be applied beyond the specifically described embodiments of the invention described herein. Moreover, in the description of the present invention, certain details have been left out in order to not obscure the inventive aspects of the invention. The details left out are within the knowledge of a person of ordinary skill in the art.

The drawings in the present application and their accompanying detailed description are directed to merely example embodiments of the invention. To maintain brevity, other embodiments of the invention which use the principles of the present invention are not specifically described in the present application and are not specifically illustrated by the present drawings.

FIG. 3 illustrates portion 300 of a VLIW processor according to one embodiment of the invention. Although FIG. 3 shows only a portion of a VLIW processor, for simplicity and ease of reference, portion 300 of the VLIW processor is referred to as "VLIW processor 300." As shown in FIG. 3, external instruction bus 360 is coupled to and communicates with instruction cache A 352 and instruction cache B 354. External instruction bus 360 carries instructions from an external memory (which is not shown in any of the drawings). The instructions carried by external instruction bus 360 are written into instruction cache A 352 and instruction cache B 354. Instruction cache A 352 is part of "thread A" of the VLIW processor while instruction cache B 354 is part of "thread B" of the VLIW processor. By way of example, instruction cache A 352 can be a two-way set associative instruction cache while instruction cache B 354 can also be a two-way set associative instruction cache.

Cache controller 358 communicates with both instruction cache A 352 and instruction cache B 354. Common instruction memory 356 has a segment containing instructions used by thread A and a segment containing instructions used by thread B in the present embodiment of the VLIW processor.

Common instruction memory 356 can communicate with both instruction cache A 352 and instruction cache B 354.

Figure 2:
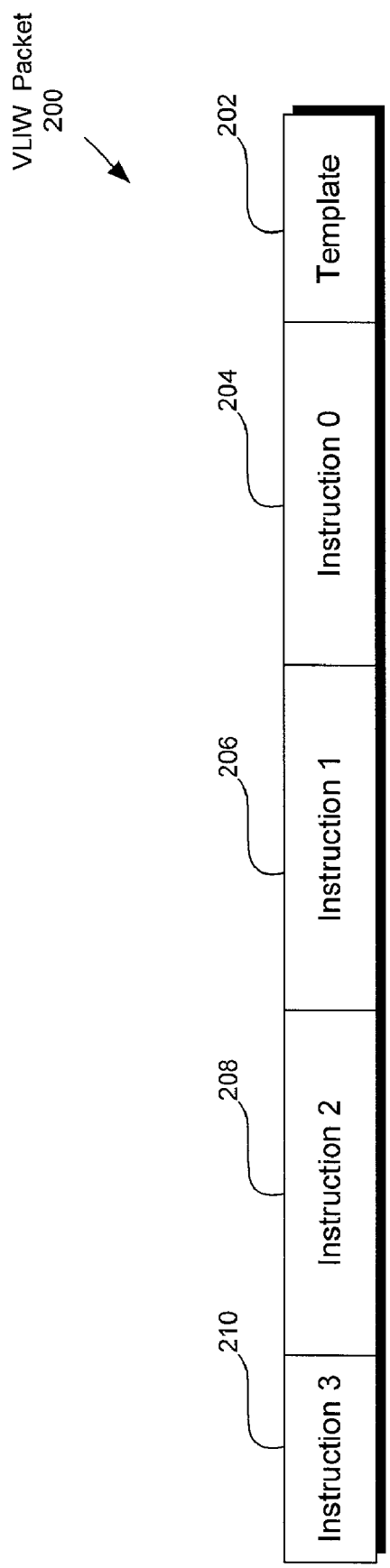
FIG. 2 illustrates a VLIW packet which comprises a template, three long instructions, and one short instruction.

Shared packet register 350 can download VLIW packets from instruction cache A 352, instruction cache B 354, or common instruction memory 356. In the present embodiment of the invention, shared packet register 350 is a 128-bit register which can hold a VLIW packet such as exemplary VLIW packet 200 of FIG. 2. Program counter A 346 belongs to thread A of the VLIW processor and communicates with common instruction memory 356, cache controller 358, and instruction cache A 352. Program counter A 346 provides instruction addresses to common instruction memory 356 and cache controller 358. Program counter B 344 belongs to thread B of the VLIW processor and communicates with common instruction memory 356, cache controller 358, and instruction cache B 354. Program counter B 344 provides instruction addresses to common instruction memory 356 and cache controller 358.

Issue group A register 340 communicates with shared packet register 350 and receives instructions belonging to a single issue group for processing in thread A in the present embodiment of the invention's VLIW processor. Similarly, issue group B register 342 communicates with shared packet register 350 and receives instructions belonging to a single issue group for processing in thread B. Control/decode logic 348 determines which issue groups would be forwarded to issue group register A 340 and which issue groups would be forwarded to issue group register B 342. Control/decode logic 348 also determines the timing for the forwarding of the issue groups to issue group register A 340 and issue group register B 342.

Internal instruction dispatch logic 338 is in communication with issue group register A 340 and issue group register B 342. Internal instruction dispatch logic 338 provides instructions in issue group register A 340 to thread A processing unit 303 through internal instruction bus 370. Similarly, internal instruction dispatch logic 338 provides instructions in issue group register B 342 to thread B processing unit 305 through internal instruction bus 380.

In the present embodiment, thread A processing unit 303 comprises vector register file 326, scalar register files 322 and 324, data paths 306 and 308, load/store units 314 and 316, and load/store register file 334. Manifestly, different types and numbers of registers and data paths can be utilized and the specific types and numbers of registers and data paths used in thread A processing unit 303 serve only as examples.

As shown in thread A processing unit 303, internal instruction bus 370 provides instructions to thread A processing unit 303 from internal instruction dispatch logic 338. The instructions provided to thread A processing unit 303 operate on various operands within thread A processing unit 303. For example, vector register file 326 provides vector operands to vector instructions that may exist within an issue group being executed in thread A processing unit 303. Likewise, scalar register files 322 and 324 provide scalar operands to scalar instructions that may exist within an issue group being executed in thread A processing unit 303.

In one embodiment, vector register file 326 and scalar register files 322 and 324 may be divided into banks. In other words, vector register file 326 may be subdivided into vector register file banks and each scalar register file 322 or 324 may be subdivided into respective scalar register file banks. For example, vector register file 326 can comprise four banks, where each bank has a number of 64-bit registers, a number of read ports, and a number of write ports. Each scalar register file 322 or 324 can also comprise four banks, where each bank has a number of 32-bit registers, a number of read ports, and a number of write ports.

Load/store units 314 and 316 perform memory fetches from thread A memory 304 and load the fetched data into load/store register file 334 and scalar register files 324 and 322 as well as vector register file 326. Data paths 306 and 308 typically contain a variety of different types of functional units such as multiply-accumulate ("MAC") units, adders, subtractors, logical shifts, arithmetic shifts, and any other functional units for performing mathematical or logical operations. The result of operations performed by data paths 306 and 308 on scalar or vector operands provided by scalar register files 324 and 322 and vector register file 326 can be stored in thread A memory 304.

In the present embodiment, thread B processing unit 305 is similar to thread A processing unit 303 and comprises vector register file 332, scalar register files 328 and 330, data paths 310 and 312, load/store units 318 and 320, and load/store register file 336. Manifestly, different types and numbers of registers and data paths can be utilized and the specific types and numbers of registers and data paths used in thread B processing unit 305 serve only as examples.

As shown in thread B processing unit 305, internal instruction bus 380 provides instructions to thread B processing unit 305 from internal instruction dispatch logic 338. The instructions provided to thread B processing unit 305 operate on various operands within thread B processing unit 305. For example, vector register file 332 provides vector operands to vector instructions that may exist within an issue group being executed in thread B processing unit 305. Likewise, scalar register files 328 and 330 provide scalar operands to scalar instructions that may exist within an issue group being executed in thread B processing unit 305.

In one embodiment, vector register file 332 and scalar register files 328 and 330 may be divided into banks. In other words, vector register file 332 may be subdivided into vector register file banks and each scalar register file 328 or 330 may be subdivided into scalar register file banks. For example, vector register file 332 can comprise four banks, where each bank has a number of 64-bit registers, a number of read ports, and a number of write ports. Each scalar register file 328 or 330 can also comprise four banks, where each bank has a number of 32-bit registers, a number of read ports, and a number of write ports.

Load/store units 318 and 320 perform memory fetches from thread B memory 302 and load the fetched data into load/store register file 336 and scalar register files 328 and 330 as well as vector register file 332. Data paths 310 and 312 typically contain a variety of different types of functional units such as multiply-accumulate ("MAC") units, adders, subtractors, logical shifts, arithmetic shifts, and any other functional units for performing mathematical or logical operations. The result of operations performed by data paths 310 and 312 on scalar or vector operands provided by scalar register files 328 and 330 and vector register file 332 can be stored in thread B memory 302.

By way of overview, the embodiment of the invention illustrated in FIG. 3 significantly increases the performance of a VLIW processor in that it permits the VLIW processor to execute twice the number of instructions in a given number of clock cycles while efficiently utilizing the resources of the VLIW processor so as to avoid a significant increase in the processor's power consumption—the consumed power is increased by at most 20% while the execution speed is doubled. Moreover, the embodiment of the invention illustrated in FIG. 3 utilizes the chip area in an efficient manner and in fact usually requires a smaller area for the internal instruction bus than the presently known VLIW processors. These and other aspects of the invention are described in more detail below by way of a specific example.

At this point, the processing of two exemplary VLIW packets are discussed in order to illustrate the operation of the embodiment of the invention shown in FIG. 3. The first exemplary VLIW packet is VLIW packet 410 shown in FIG. 4A while the second exemplary VLIW packet is VLIW packet 430 shown in FIG. 4B. Suppose that exemplary VLIW packet 410 in FIG. 4A comprises three long instructions and one short instruction in the following manner: A long ADD instruction as instruction 0 in instruction slot 414, a long MAC ("multiply-accumulate") instruction as instruction 1 in instruction slot 416, a long AND instruction as instruction 2 in instruction slot 418, and a short SUB ("subtract") instruction as instruction 3 in instruction slot 420. In this example, long ADD instruction 414 and long MAC instruction 416 are independent of each other and can be executed in the same clock cycle and, therefore, belong to the same issue group, i.e. first issue group 422 of VLIW packet 410. Also, in this example, long AND instruction 418 and short SUB instruction 420 are independent of each other and can be executed in the same clock cycle and, therefore, belong to the same issue group, i.e. second issue group 424 of VLIW packet 410. It is noted that, by definition, first issue group 422 and second issue group 424 of VLIW packet 4 10 cannot be executed in the same clock cycle.

Suppose further that exemplary VLIW packet 430 in FIG. 4B also comprises three long instructions and one short instruction in the following manner: A long SUB instruction as instruction 0 in instruction slot 434, a long SHIFT instruction as instruction 1 in instruction slot 436, a long SHIFT instruction as instruction 2 in instruction slot 438, and a short OR instruction as instruction 3 in instruction slot 440. In the present example, long SUB instruction 434 and long SHIFT instruction 436 are independent of each other and can be executed in the same clock cycle and, therefore, belong to the same issue group, i.e. first issue group 442 of VLIW packet 430. Also, in this example, long SHIFT instruction 438 and short OR instruction 440 are independent of each other and can be executed in the same clock cycle and, therefore, belong to the same issue group, i.e. second issue group 444 of VLIW packet 430. It is noted that, by definition, first issue group 442 and second issue group 444 of VLIW packet 430 cannot be executed in the same clock cycle.

According to conventional VLIW processors, execution of VLIW packets 410 and 430 would take four clock cycles. According to conventional VLIW processors, in a first clock cycle issue group 422 of VLIW packet 410 is executed and in a second clock cycle, issue group 424 of VLIW packet 410 is executed. During the second clock cycle, when issue group 424 of VLIW packet 410 is being executed, VLIW packet 430 is being fetched from a cache or an external memory. During a third clock cycle issue group 442 of VLIW packet 430 is executed. Finally, during a fourth clock cycle issue group 444 of VLIW packet 430 is executed. Thus, according to conventional VLIW processors, four clock cycles are required to execute two exemplary VLIW packets 410 and 430, where each of the VLIW packets consists of two issue groups.

In contrast, according to the invention, exemplary VLIW packets 410 and 430 are executed in only two clock cycles while the consumed power is not increased, or increased at most 20%, compared to the conventional VLIW processors discussed above. According to the invention, during a single clock cycle, issue group 422 of VLIW packet 410, containing long ADD instruction 414 and long MAC instruction 416, and issue group 442 of VLIW packet 430, containing long SUB instruction 434 and long SHIFT instruction 436, can be executed. Issue group 424 of VLIW packet 410 is dependent on, and must await completion of the execution of issue group 422 before being executed. However, issue group 442 of VLIW packet 430 is not dependent on, and does not need to wait for completion of the execution of issue group 422 of VLIW packet 410. As such, both issue group 422 of VLIW packet 410 and issue group 442 of VLIW packet 430 can be executed during the same clock cycle. As illustrated below, the invention accomplishes simultaneous execution of two independent issue groups, such as exemplary issue groups 422 and 442, belonging to two different VLIW packets.

Referring to FIG. 3, instruction cache A 352 belongs to thread A of VLIW processor 300 and instruction cache B 354 belongs to thread B of VLIW processor 300. By way of an example, program counter A 346 contains the address of VLIW packet 410 which, in the present example, is already stored in instruction cache A 352. Again by way of an example, program counter B 344 contains the address of VLIW packet 430 which, in the present example, is already stored in instruction cache B 354.

VLIW packet 410, whose address is contained in program counter A 346, is fetched prior to its execution in thread A processing unit 303 and, at the beginning of a first clock cycle, issue group 422 of VLIW packet 410 resides in issue group A register 340. Similarly, VLIW packet 430, whose address is contained in program counter B 344, is also fetched prior to its execution in thread B processing unit 305 and, at the beginning of the first clock cycle, issue group 442 of VLIW packet 430 resides in issue group B register 342.

During the first clock cycle, issue group 422 of VLIW packet 410 is sent from issue group A register 340 to thread A processing unit 303 through internal instruction bus 370. Similarly, during the same clock cycle, i.e. the first clock cycle, issue group 442 of VLIW packet 430 is sent from issue group B register 342 to thread B processing unit 305 through internal instruction bus 380. During the same clock cycle, i.e. the first clock cycle, issue group 422 of VLIW packet 410 is executed in thread A processing unit 303 and issue group 442 of VLIW packet 430 is executed in thread B processing unit 305. More specifically, long ADD instruction 414 and long MAC instruction 416 of issue group 422 of VLIW packet 410 are executed in data paths 306 and 308 of thread A processing unit 303 during the first clock cycle. Similarly, long SUB instruction 434 and long SHIFT instruction 436 of issue group 442 of VLIW packet 430 are executed in data paths 310 and 312 of thread B processing unit 305 during the same clock cycle, i.e. during the first clock cycle.

At the beginning of a second clock cycle, issue group 424 of VLIW packet 410 resides in issue group A register 340 while issue group 444 of VLIW packet 430 resides in issue group B register 342. During the same clock cycle, i.e. the second clock cycle, issue group 424 of VLIW packet 410 is sent from issue group A register 340 to thread A processing unit 303 through internal instruction bus 370. Similarly, during the same clock cycle, i.e. the second clock cycle, issue group 444 of VLIW packet 430 is sent from issue group B register 342 to thread B processing unit 305 through internal instruction bus 380. During the same clock cycle, i.e. the second clock cycle, issue group 424 of VLIW packet 410 is executed in thread A processing unit 303 and issue group 444 of VLIW packet 430 is executed in thread B processing unit 305. More specifically, long AND instruction 418 and short SUB instruction 420 of issue group 424 of VLIW packet 410 are executed in data paths 306 and 308 of thread A processing unit 303 during the second clock cycle. Similarly, long SHIFT instruction 438 and short OR instruction 440 of issue group 444 of VLIW packet 430 are executed in data paths 310 and 312 of thread B processing unit 305 during the same clock cycle, i.e. during the second clock cycle.

From the above description of the operation of the present embodiment of the invention, it is manifest that two clock cycles are required for execution of two VLIW packets 410 and 430. In contrast and as discussed above, according to conventional VLIW processors, four clock cycles are required for execution of VLIW packets 410 and 430. Reasons for this doubling of execution speed are the unique architecture and the unique issue grouping of VLIW packets according to the present invention.

More specifically, the invention utilizes two processing units, i.e. thread A processing unit 303 and thread B processing unit 305, as opposed to the single processing unit used in the conventional VLIW processors. Moreover, according to the present embodiment of the invention, each VLIW packet is divided into two issue groups where one issue group would consist of 64 bits and the other issue group would consist of 48 bits. For example, one issue group would consist of four short instructions and the other issue group would consist of three short instruction. As another example, one issue group would consist of two long instructions while the other issue group would consist of one long instruction and one short instruction. In fact, VLIW packets 410 and 430 represent the latter example, i.e. each VLIW packet 410 or 430 has two issue groups where one issue group consists of two long instructions while the other issue group consists of one long instruction and one short instruction.

In the present embodiment of the invention, the assembly code written for the VLIW processor consists of VLIW packets with one issue group having 64 bits and the other issue group having 48 bits. Thus, if a particular VLIW packet contains only one issue group, the VLIW packet is divided up into two issue groups, with one issue group being 64 bits and the other being 48 bits. Moreover, the VLIW packets are not permitted to have three or more issue groups. Thus, in the present example, all VLIW packets processed by the invention's VLIW processor 300 would contain exactly two issue groups, one issue group being 64 bits and the other issue group being 48 bits. The unique architecture and the unique issue grouping in the present invention results in a doubling of the execution speed of the VLIW process as explained above. However, as discussed below, this doubling of the execution speed does not result in a doubling of the consumed power. As such, the present invention significantly differs from prior attempts to increase the processing speed of conventional VLIW processors.

From the examples given above it is appreciated that, according to the present embodiment of the invention, the width of each internal instruction bus 370 or 380 does not need to be greater than 64 bits in order to transport the various issue groups to thread A processing unit 303 or thread B processing unit 305 for execution. However, according to conventional VLIW processors, an internal instruction bus having a width of at least 112 bits would be required. The reason is that, according to conventional VLIW processors, it is possible that all of the instructions in a VLIW packet belong to a single issue group. In other words, it is possible that the VLIW packet contains only one issue group. As such, all of the instructions contained in the VLIW packet must be transported simultaneously to a processing unit for execution. Thus, in the above examples, the conventional VLIW processor would need a 112-bit wide internal instruction bus. As is known in the art, power is consumed when each bus line corresponding to a particular bit is charged or discharged. Moreover, and in general, each line in the bus corresponding to a particular bit consumes some power in each clock cycle even when that particular bus line is not being used to transfer information during that clock cycle.

Also, the capacitance of each bus line is directly proportional to the length of the bus line. In one embodiment, the total length of internal instruction buses 370 and 380 is less than the length of the single internal instruction bus in a conventional VLIW processor. Moreover and as stated above, in the present invention each internal instruction bus 370 or 380 is about half as wide as the internal instruction bus in a conventional VLIW processor. Thus, the conventional VLIW processor's 112-bit wide internal instruction bus typically consumes a greater amount of power as compared with the power consumed by the two 64-bit wide internal instruction buses in the present embodiment of the invention.

Moreover, according to the conventional VLIW processors, various units of the processor, such as the fetch or decode logic, would be clocked and would consume power while awaiting execution of a VLIW packet. For example, a VLIW packet, such as exemplary VLIW packet 410, would have taken two clock cycles for execution in a conventional VLIW processor. During the second clock cycle when issue group 424 of VLIW packet 410 is being executed, the fetch logic in the conventional VLIW processor would fetch a new VLIW packet, such as VLIW packet 430. However, during the first clock cycle when issue group 422 of VLIW packet 410 is being executed, the fetch logic in the conventional VLIW processor would be useless, while still consuming power. In general, any clocked circuit or logic unit in the conventional VLIW processor which remains useless during the first clock cycle, when issue group 422 of VLIW packet 410 is being executed, would contribute to unnecessary power consumption in the VLIW processor.

In contrast, according to the present embodiment of the invention, during each clock cycle, a new VLIW packet is being fetched. For example, during execution of issue group 422 of VLIW packet 410 and issue group 442 of VLIW packet 430 in the first clock cycle, a new VLIW packet is fetched which would be executed after completion of the execution of VLIW packets 410 and 430. Similarly, during execution of issue group 424 of VLIW packet 410 and issue group 444 of VLIW packet 430 in the second clock cycle, another new VLIW packet is fetched which would be executed after completion of the execution of VLIW packets 410 and 430. Thus, during the third and fourth clock cycles, both VLIW packets which were fetched during the execution of VLIW packets 410 and 430 would be executed. It is thus manifest that any circuitry that is clocked during execution of the various issue groups in the present embodiment of the invention, for example the fetch and decode logic units in the VLIW processor, would be efficiently utilized and power would not be needlessly consumed.

To be sure, according to the present embodiment of the invention during each clock cycle two processing units, i.e. thread A processing unit 303 and thread B processing unit 305, consume power to execute two issue groups. This is in contrast with the conventional VLIW processor where in each clock cycle power is consumed in a single processing unit to execute a single issue group. However, any additional power consumption associated with the extra processing unit in the invention is largely offset due to the fact that the internal instruction buses, i.e. internal instruction buses 370 and 380, are almost half as wide as a conventional VLIW processor's internal instruction bus and that the total length of internal instruction buses 370 and 380 is also less than the length of the conventional VLIW processor's internal instruction bus. Moreover, the general "overhead" power consumed because of the clocked, but unused, logic units and circuits in a conventional VLIW processor is comparable to the power consumed in the invention's VLIW processor, despite the fact that the invention utilizes two processing units 303 and 305 instead of the single processing unit used in a conventional VLIW processor. Therefore, it is appreciated that according to the invention the total additional power required to double the execution speed of the VLIW processor is insignificant due to the power savings associated with the invention's internal instruction buses and also the efficient utilization of the power that is otherwise unnecessarily consumed in a conventional VLIW processor.

It is noted that another advantage of the present embodiment of the invention is that the chip area used up by the 64-bit wide internal instruction buses 370 and 380 is typically less than the chip area used by the 112-bit wide internal instruction bus in a conventional VLIW processor. The reason is that the layout of two short 64-bit buses typically requires less area than a single relatively long 112-bit bus.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention.

For example, in the invention's embodiment specifically described above, each VLIW packet is 128 bits long; however, it is appreciated by a person of ordinary skill in the art that the invention's principles would apply equally to a VLIW processor using VLIW packets of any length, for example a length of 256 bits. In one embodiment, each VLIW packet can be 256 bits and would consist of two issue groups where one issue group can be 128 bits wide and the other issue group can be 112 bits wide (leaving a 16-bit field for a template in the VLIW packet). For example, one issue group can consist of 8 short instructions while the other issue group can consist of 7 short instructions. As another example, one issue group can consist of four long instructions while the other issue group can consist of three long instructions and one short instruction. In the 256-bit embodiment, the width of each internal instruction bus can be 128 bits. It is appreciated by one of ordinary skill in the art that the same advantages described above relative to a VLIW processor using 128-bit VLIW packets would apply to an embodiment using 256-bit VLIW packets.

Moreover, the principals of the invention can be extended to design a VLIW processor having four or more threads, instead of the two threads specifically described above. For example, where four threads are used, there can be a respective processing unit in each of the four threads and four issue groups can be executed in the same clock cycle. In this manner, the advantages of the invention can be extended to create increasingly efficient VLIW processors. Therefore, it is appreciated that the specifically described embodiments are to be considered in all respects as illustrative and not restrictive. It should also be understood that the invention is not limited to the particular embodiments described herein, but is capable of many rearrangements, modifications, and substitutions without departing from the scope of the invention.

Thus, a high performance VLIW processor has been described.

The invention claimed is:

1. A processor comprising:
   i. A first thread and a second thread, said first thread comprising a first processing unit and said second thread comprising a second processing unit;
   ii. A first instruction packet and a second instruction packet, said first instruction packet comprising at most two issue groups and said second instruction packet comprising at most two issue groups, each of said at most two issue groups of said first instruction packet and each of said at most two issue groups of said second instruction packet comprising at most 64 bits and an internal instruction bus no greater than 64 bits wide for transport to one of said first and second processing units;
   iii. Each of said first and second threads receiving a respective one of said at most two issue groups of a respective one of said first and second instruction packets;
   iv. Said first processing unit executing one of said at least two issue groups of said first instruction packet and said second processing unit executing one of said at most two issue groups of said second instruction packet in a single clock cycle;
   v. Each of said at most two issue groups of each of said first and second instruction packets performing an operation on data fetched from an exclusive thread memory communicating with only one of said first and second threads, a result of said operation being stored back in said exclusive thread memory communicating with said only one of said first and second threads.

2. The processor of claim 1 wherein said each of said first and second instruction packets is 128 bits wide.

3. The processor of claim 1 wherein said first instruction packet comprises two issue groups, wherein a first one of said two issue groups is 64 bits wide and a second one of said two issue groups is 48 bits wide.

4. The processor of claim 1 wherein said first instruction packet comprises two issue groups, wherein a first one of said two issue groups is 48 bits wide and a second one of said two issue groups is 64 bits wide.

5. The processor of claim 1 wherein said each of said first and second instruction packets resides in a respective instruction cache and is addressed by a respective program counter.

6. A method for improving performance of a VLIW processor comprising:
   dividing a first instruction packet into first and second issue groups, each of said first and second issue groups of said first instruction packet comprising at most 64 bits;
   dividing a second instruction packet into first and second issue groups, each of said first and second issue groups of said second instruction packet comprising at most 64 bits;
   providing, through a first internal instruction bus no greater than 64 bits wide, said first issue group of said first instruction packet to a first thread having a first thread processing unit and, through a second internal instruction bus no greater than 64 bits wide, said first issue group of said second instruction packet to a second thread having a second thread processing unit during a first clock cycle; and providing, through said first internal instruction bus, said second issue group of said first instruction packet to said first thread having said first thread processing unit and, through said second internal instruction bus, said second issue group of said second instruction packet to said second thread having said second thread processing unit during a second clock cycle, wherein said first instruction packet is a different instruction packet than said second instruction packet;

fetching data from an exclusive thread memory communicating with only one of said first and second threads;

performing an operation on said data by one of said first and second issue groups of said first instruction packet and said first and second issue groups of said second instruction packet;

storing back a result of said operation in said exclusive thread memory communicating with said only one of said first and second threads.

7. The method of claim 6 wherein each of said first and second instruction packets consists of 128 bits.

8. The method of claim 6 wherein said first issue group of said first instruction packet comprises 64 bits and said second issue group of said first instruction packet comprises 48 bits.

9. The method of claim 6 wherein said first issue group of said first instruction packet comprises 48 bits and said second issue group of said first instruction packet comprises 64 bits.

10. The method of claim 6 wherein said first issue group of said second packet comprises 64 bits and said second issue group of said second packet comprises 48 bits.

11. The method of claim 6 wherein said first issue group of said second packet comprises 48 bits and said second issue group of said second packet comprises 64 bits.

12. A method for improving performance of a VLIW processor comprising:

i. Dividing a first instruction packet into first and second issue groups and a second instruction packet into first and second issue groups, each of said first and second issue groups of said first instruction packet and said first and second issue groups of said second instruction packet comprising at most 64 bits;

ii. Providing each of said first and second issue groups of said first instruction packet and said first and second issue groups of said second instruction packet, in one of two clock cycles, to a respective thread having a respective processing unit, and an internal instruction bus no greater than 64 bits wide for transport to said respective processing unit;

iii. Executing said first and second instruction packets in said two clock cycles, wherein an issue group from each of said first and second instruction packets is executed in one of said two clock cycles;

iv. Fetching data from an exclusive thread memory communicating with only one thread;

v. Performing an operation on said data by one of said first and second issue groups of said first instruction packet and said first and second issue groups of said second instruction packet;

vi. Storing back a result of said operation in said exclusive thread memory communicating with said only one thread.

13. The method of claim 12 wherein said each of said first and second instruction packets is 128 bits wide.

14. The method of claim 12 wherein said first issue group of said first instruction packet is 64 bits wide and said second issue group of said first instruction packet is 48 bits wide.

15. The method of claim 12 wherein said first issue group of said first instruction packet is 48 bits wide and said second issue group of said first instruction packet is 64 bits wide.

16. The method of claim 12 wherein said first issue group of said second instruction packet is 64 bits wide and said second issue group of said second instruction packet is 48 bits wide.

17. The method of claim 12 wherein said first issue group of said second instruction packet is 48 bits wide and said second issue group of said second instruction packet is 64 bits wide.

18. The method of claim 12 wherein said each of said first and second instruction packet resides in a respective instruction cache and is addressed by a respective program counter.

* * * * *